Oct. 18, 1960 H. N. BEVERIDGE 2,956,718

BIDIRECTIONAL TAPE TRANSPORT APPARATUS

Filed April 15, 1955 4 Sheets-Sheet 1

INVENTOR
HAROLD N. BEVERIDGE
BY Elmer J. Gorn
ATTORNEY

Oct. 18, 1960 H. N. BEVERIDGE 2,956,718

BIDIRECTIONAL TAPE TRANSPORT APPARATUS

Filed April 15, 1955 4 Sheets-Sheet 2

INVENTOR
HAROLD N. BEVERIDGE
BY Elmer J. Gorn
ATTORNEY

BIDIRECTIONAL TAPE TRANSPORT APPARATUS

Filed April 15, 1955 4 Sheets-Sheet 3

INVENTOR
HAROLD N. BEVERIDGE
BY Elmer J. Gorn
ATTORNEY

BIDIRECTIONAL TAPE TRANSPORT APPARATUS

Filed April 15, 1955

INVENTOR
HAROLD N. BEVERIDGE
BY Elmer J. Gorn
ATTORNEY

United States Patent Office 2,956,718

Patented Oct. 18, 1960

2,956,718

BIDIRECTIONAL TAPE TRANSPORT APPARATUS

Harold N. Beveridge, Kenilworth, Ill., assignor, by mesne assignments, to Minneapolis-Honeywell Regulator Company, a corporation of Delaware Filed Apr. 15, 1955, Ser. No. 501,605

13 Claims. (Cl. 226—50)

This invention relates to an electrostatic tape and electrostatic tape drive mechanism, and more particularly, to the use of electrostatic forces for controlling the movement of tape.

In this invention there is disclosed apparatus and methods for utilizing electrostatic forces to restrain relative motion between a first member, such as a capstan, and a second member, such as a tape. The tape is of two specific types, one of which comprises a conductive member bonded on one side to a nonconductive base member, and magnetic material bonded to the other side of said conductive member. The second basic tape comprises a conductive member bonded to magnetic material. The electrostatic forces referred to previously are generated between the capstan and the conductive member located in the tape. The capstan consists of a conductive member bonded to a nonconductive member, said nonconductive member placed in such a position as to be capable of making contact with a second member, such as the tape. The electrostatic clutch acts on the principle of the attraction of two plates of an electrically-charged condenser. The capstan of the electrostatic clutch acts as one of these, and the electrically-conductive member in the tape as the other.

In the electrostatic tape drive, faster accelerations and decelerations are possible than in conventional tape-handling mechanisms due to the fact that all external masses other than the tape itself have been eliminated. Heretofore, tapes have been controlled by having a continuously rotating capstan held in close proximity to the tape to be controlled, and then at the appropriate time a suitable friction-producing member, such as a rubber wheel, would be operated upon, thereby causing said tape to bear against the rotating capstan causing said tape to move at the speed of the capstan. Various methods, such as the inflated boot system, the moving coil magnetic actuator, and the vacuum clutch, to name a few, have been devised to bring the tape in contact with the rotating capstan. In all these aforementioned systems it is always necessary for the tape drive signal voltage to operate some intermediate device such as a valve, a control, or build up an electromagnetic field which, in turn, will attract some other mass. In its broadest aspect this invention utilizes a tape as one element of an electrostatic clutch and a capstan as the second element in the clutching operation of attracting said tape to said capstan. This method eliminates all intermediate steps and apparatus between the initiating pulse and the desired action.

In the present invention, the application of a signal voltage to the conductive member of the capstan constructed in accordance with the principles of this invention will immediately cause an electrostatic force to appear between the conductive portion of said tape, previously referred to, and said capstan, thereby immediately attracting said tape to said capstan. The improved acceleration time achieved by this system of applying electrostatic forces between a first member, such as a capstan, and the conductive portion of the tape is duplicated in the deceleration time of said tape by simply applying a voltage between a stationary portion of the capstan and said conductive member on said tape. It will be noted, therefore, that for deceleration the electrostatic forces are applied between the conductive member on said tape and the stationary portion of said capstan, as opposed to acceleration, which is achieved by applying electrostatic forces between said conductive member of said tape and the movable portion of said capstan.

Further objects and advantages of this invention will be apparent as the description progresses, reference being made to the accompanying drawings wherein.

Figure 1:
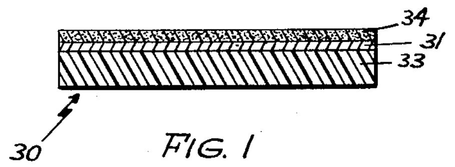
Fig. 1 is a cross-sectional view of an embodiment of a three-element tape constructed in accordance with this invention.

Referring now to Fig. 1, there is shown a three-layer tape 30 constructed in accordance with the principles of this invention, having a conductive member 31 bonded on one side to a nonconductvie base member 33, and magnetic material 34 bonded to the other side of said conductive member 31.

Figure 2:
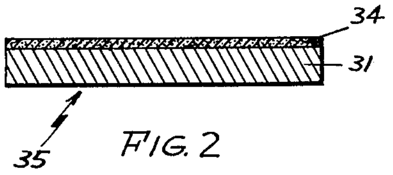
Fig. 2 is a cross-sectional view of a two-element tape constructed in accordance with this invention.

In Fig. 2 there is shown a two-layer tape 35 comprising a conductive member 31 bonded to magnetic material 34. It will be observed that tape 30 and tape 35 differ in the application of a nonconductive member 33 to the conductive member 31 for tape 30, whereas tape 35 does not have any nonconductive coating over conductive member 31. In the preferred embodiment conductive member 31 is continuously conductive, and in the normal process of manufacture, it is usually flashed on to nonconductive base 33. Since the tapes must be extremely flexible and light, nonconductive member 33 has been constructed of a plastic material having a high dielectric strength. A very strong, light tape has been built up of 0.0005 inch of aluminum for conductive member 31, 0.0009 inch cellulose acetate for nonconductive member 33, and magnetic material applied to the other surface of conductive member 31 in the normal manner. Tape 30 and tape 35 have different applications determined by the kind of voltage used, the speed of the tape, the acceleration deceleration forces encountered and the wear between the capstan coating and the tape backing. If a very hard, resistant, capstan insulation material such as aluminite is used, tape 35 with an open metallic surface would permit the use of a light brush to lead in the driving potential.

Figures 3, 4, 5:
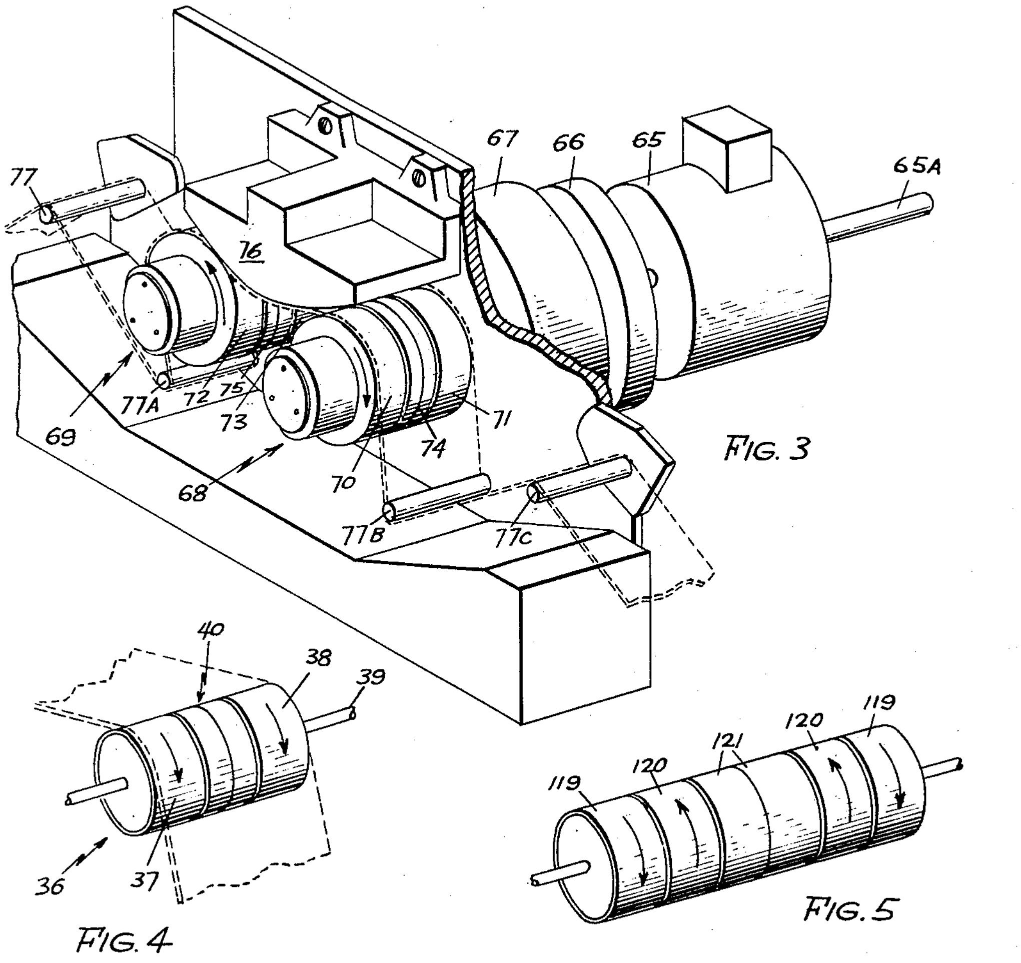
Fig. 3 is an illustration of a capstan drive mechanism and magnetic head assembly.
Fig. 4 is an illustration of a four-section capstan assembly.
Fig. 5 is an illustration of a six-section capstan assembly.
Figure 6:
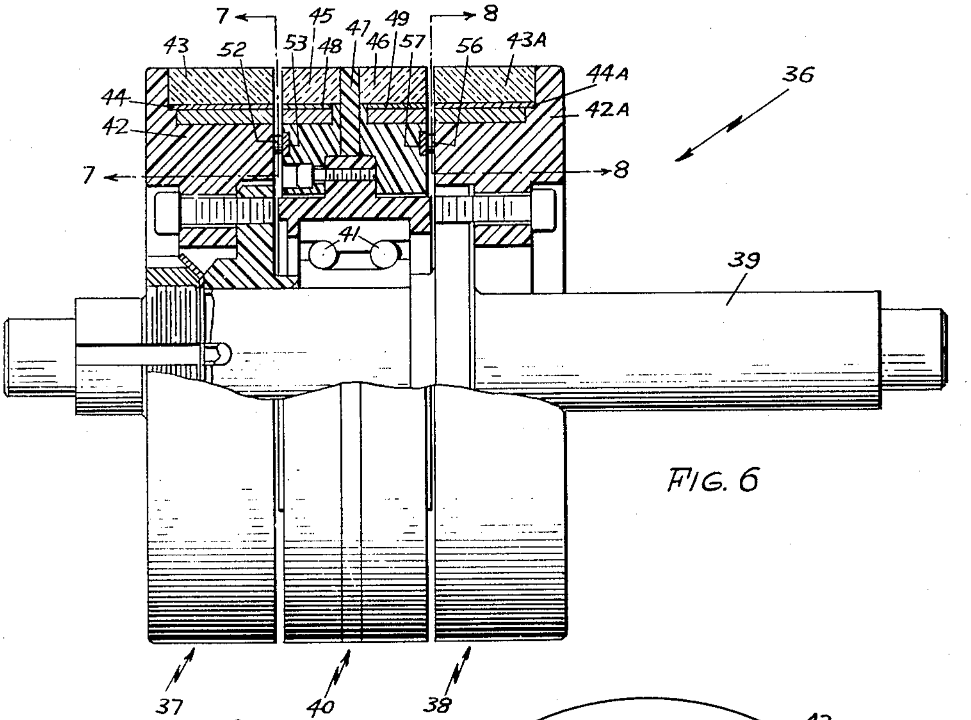
Fig. 6 is a cross section of the four-section capstan assembly shown in simplified form in Fig. 4.

Referring now to Figs. 4 and 6, there is shown a four-section capstan 36. Capstan 36 is called a split capstan, since both driving sections 37 and 38 are separate or split and directly attached to shaft 39, whereas the stationary nonrotating section 40 is mounted on ball bearings 41 and is free to rotate about shaft 39, or in other words, stationary section 40 will not rotate as shaft 39 rotates. Rotating section 37 is identical to rotating section 38 in that a nonconductive member 42, preferably constructed of a phenol composition, has imbedded in its periphery a high K dielectric material 43, such as barium titanate, insulated from shaft 39 by phenol member 42. Conductive member 44 is bonded to dielectric member 43 in order to form a path for supplying the electrostatic force between member 43 and conductive member 31 of either tape 30 or 35. It will be observed that dielectric member 43 does not fully cover the width of section 37 due to the effect of very high fields initiating corona discharges which burn the tape and create erratic tracking problems. By building up the sides of driving member 37 with phenol material, as illustrated, the corona discharge problem has been reduced, if not eliminated. Rotating section 38 comprising phenol member 42A and dielectric member 43A is constructed of the same material and in a similar manner as rotating member 37. Fixed member 40, which does not rotate as shaft 39 rotates, is constructed of two sections of dielectric material 45 and 46, preferably constructed of the same material as 43 and 43A. A phenol section 47 is used to effectively insulate dielectric section 45 and dielectric section 46, which, in effect, results in a split, or two electrically nonrotating sections. A conductive member 48 is bonded to dielectric material 45, and a conductive member 49 is bonded to dielectric material 46 in a similar manner as conductive material 44 and 44A are bonded to dielectric members 43 and 43A.

Figures 7, 8, 9, 10:
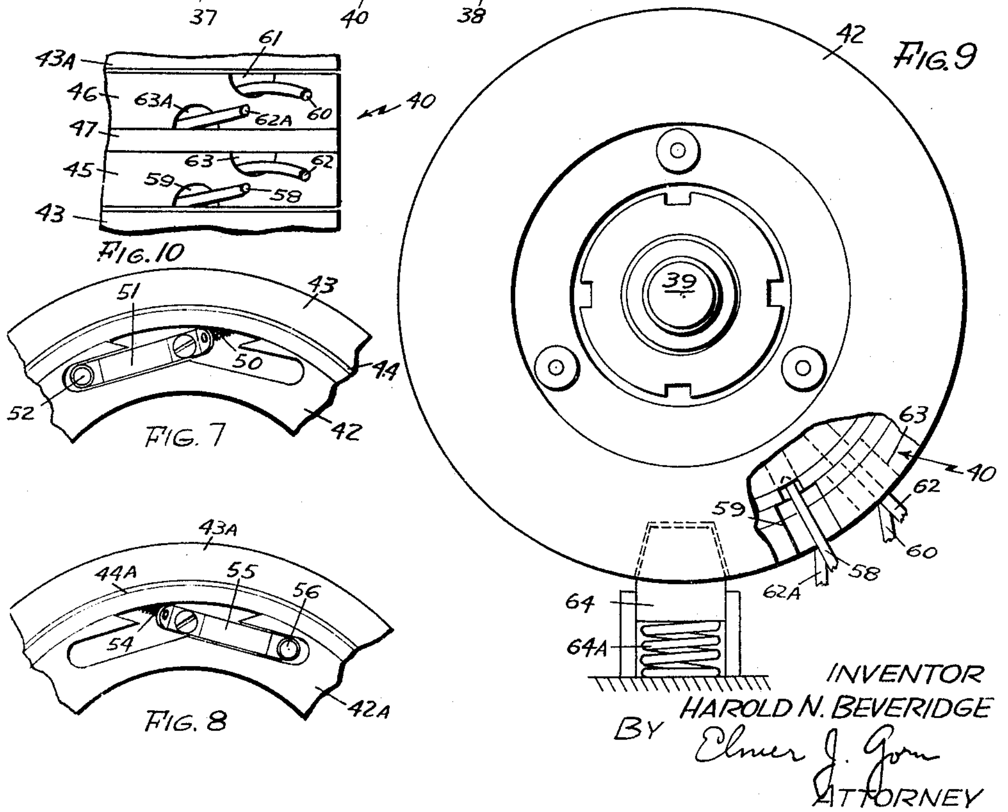
Fig. 7 is section 7—7 of Fig. 6.
Fig. 8 is section 8—8 of Fig. 6.
Fig. 9 is a front view of the capstan assembly illustrated in Fig. 6.
Fig. 10 is a partial bottom view of the stationary member of the capstan assembly illustrated in Fig. 6.

In order to control the electrostatic clutch, it is necessary to have leads electrically connected to conductive members 44 and 44A of rotating sections 37 and 38, and conductive members 48 and 49 of stationary member 40. Fig. 7, which illustrates a view of rotating member 37, shows a wire 50 electrically connecting conductive member 44 with a brush assembly 51. Brush 52 is spring loaded and is caused to bear on ring 53, which is imbedded on one side of fixed member 40 having the same radius as brush 52, thereby making continuous contact as rotating member 37 rotates. In a similar manner, Fig. 8 illustrates rotating member 38 and a wire 54 connecting conductive member 44A to a brush assembly 55, which, in turn, is connected to brush 56. Brush 56 is caused to bear on ring 57, which is imbedded in fixed member 40 in a similar manner as ring 53. Since stationary member 40 does not rotate, a lead 58 electrically connected to ring 53 is brought out through a semicircular opening 59 in fixed member 40, as shown in Figs. 9 and 10. In a similar manner, lead 60, which is electrically connected to ring 57, is brought out through a semicircular opening 61 in fixed member 40. A lead 62, which is electrically connected to conductive member 48, and a lead 62A, which is electrically connected to conductive member 49, are brought out through semicircular openings 63 and 63A located in fixed member 40. Fig. 9 shows that fixed member 40 is restrained from rotating by inserting a locking member 64 in a suitable opening in member 40. A spring 64A is used to continually force locking member 63 to maintain a snug relationship with member 40, thereby preventing member 40 from rotating as shaft 39 rotates.

Referring now to Fig. 3, there is shown a four-section capstan drive mechanism and head assembly. Driving motor 65, which is continuously rotating at a fixed speed, drives shaft 65A, upon which is connected a flywheel 66. The shaft 65A is connected to a gear box 67, which, in turn, supplies the necessary gearing ratios to drive the rotating members of four-section capstan 68 and 69 in contra-rotating directions, all at the same speed.

Capstans 68 and 69 are each identical in construction to capstan 36, illustrated in Figs. 4, 6, 7, 8, 9, and 10, the only difference being that the direction of rotation of the movable sections 70 and 71 of capstan 68 rotate in a clockwise direction, whereas movable sections 72 and 73 of capstan 69 rotate in a counterclockwise direction. The stationary members 74 and 75 of capstans 68 and 69 do not rotate. Located at a point intermediate capstans 68 and 69, and at a point lower than the radius of either capstans 68 or 69, as measured from a line through the axial center of said capstans is a magnetic head assembly 76. This is necessary to always maintain the magnetic portion 34 of the tape in contact with the magnetic head assembly 76. The tape is placed over a guide 77, under guide 77A, over capstan 69, under magnetic head assembly 76, over capstan 68, under guide 77B and over guide 77C, with the magnetic member of said tape facing the magnetic head assembly 76, thereby placing the conductive member of said tape facing capstans 68 and 69.

The key to the extremely short acceleration and deceleration time inherent in this system lies in the impressing of electrostatic forces between the tape and the capstan to restrain the relative motion between said members. The two capstans 68 and 69 are mounted on parallel shafts held to a very high accuracy and each rotating on precision bearings. All rotating elements are driven by capstan motor 65 and rotate at the same speed. The center elements 74 and 75 of capstan 68 and capstan 69 are held stationary and provide the means for stopping the tape. A choice of forward or reverse tape motion is had by an electrical signal switched to one or the other of the two pairs of contrarotating end elements of capstans 68 and 69. For example, if forward motion of the tape is desired, a voltage signal is impressed across rotating sections 70 and 71 of capstan 68, thereby causing the tape and the rotating sections of the capstan to become frictionally engaged with each other. As long as the tape and the rotating sections of the capstans are engaged, the tape will move in the direction of rotation of said capstan. In order to apply a braking action, a voltage signal is impressed across stationary members 74 and 75, thereby causing electrostatic forces to be exerted between the tape and the stationary portions of the capstan. In order to move the tape in the reverse direction, a voltage signal is applied to the counter-rotating elements 72 and 73 of capstan 69. It will be noted, therefore, that control of the movement of the tape is accomplished by simply controlling a voltage, which can be readily done by electronic means.

Figures 11, 12, 13, 14:
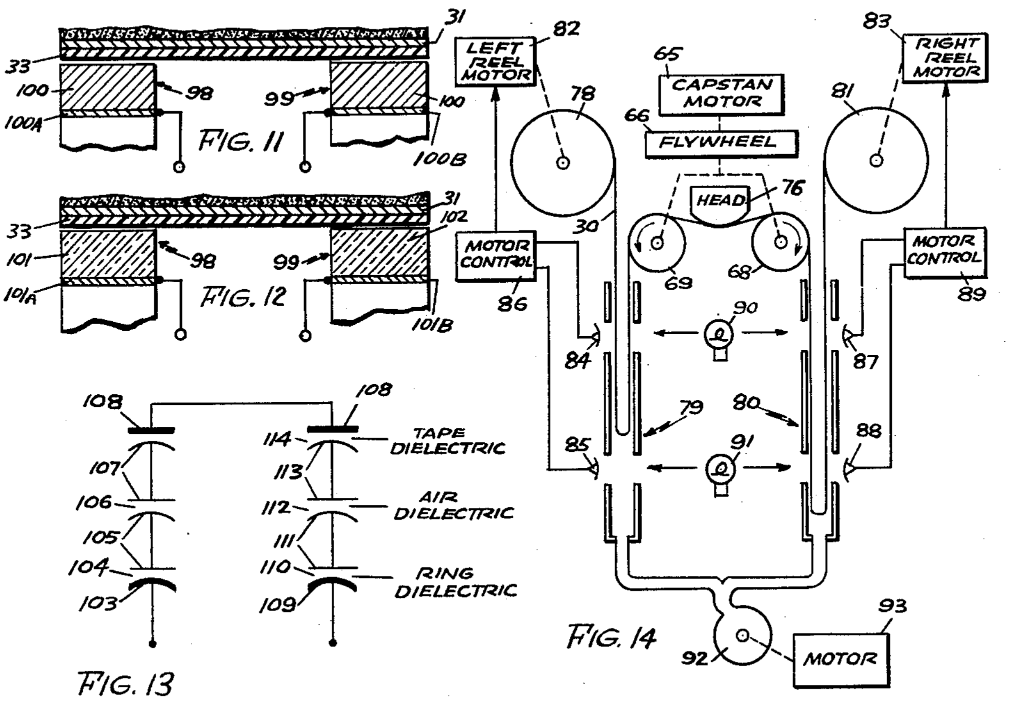
Fig. 11 is a cross section of a conductive capstan and tape.
Fig. 12 is a cross section of a nonconductive capstan and tape.
Fig. 13 is an equivalent electrical diagram of Fig. 12.
Fig. 14 illustrates a complete tape-handling system.

Referring now to Fig. 14, there is shown a complete tape-handling mechanism that is divided roughly into two sections, one being the tape, capstan, and head area, and the other being the reel control area. The tape 30 is fed from a left reel 78 to a storage chamber 79, out of storage chamber 79 over counterclockwise rotating capstan 69, under magnetic head assembly 74, over clockwise rotating capstan 68, into storage chamber 80, which is identical with storage chamber 79, out of storage chamber 80 and onto right reel 81. A left reel motor 82 drives left reel 78 at such a time and in such a direction as to keep tape 30 within predetermined limits in storage chamber 79. A right reel motor 83 drives right reel 81 in such a direction and at such a time as to keep tape 30 within prescribed limits in storage chamber 80. It can be seen, therefore, that left reel motor 82 and right reel motor 83 are not continuous running motors, since they merely supply tape into and out of storage chambers 79 and 80. In order to make the supply of tape into storage chamber 79 automatic, a photoelectric cell 84 marks the upper limit, and photoelectric cell 85 marks the lower limit for tape 30 in storage chamber 79. The output of photoelectric cell 84 controls a motor control 86, which controls the direction and time of operation of left-reel motor 82. In a similar manner, photoelectric cells 87 and 88 determine the upper and lower limits of tape 30 in storage chamber 80. The output of photoelectric cells 87 and 88 control motor control 89 which, in turn, controls the time and direction of operation of right reel motor 83. In the preferred embodiment, a single light source, such as incandescent lamp 90, is used to illuminate both upper limit photoelectric cells 84 and 87, while incandescent lamp 91 illuminates photoelectric cells 85 and 88. It can be seen, therefore, that the action of storage chamber 79 and storage chamber 80 are completely independent of each other. For example, if tape 30 is fed into storage chamber 79 at a large rate, the light beam from incandescent bulb 91 to photoelectric cell 85 will be interrupted, thereby causing motor control 86 to operate left reel motor 82 in a counterclockwise direction until tape 30 is raised to such a level as to allow a beam of light to pass freely from incandescent bulb 91 to photoelectric cell 85. The action of photoelectric cell 84 is such that if tape 30 was to be pulled out of storage chamber 79, incandescent bulb 90 would shine on photoelectric cell 84, thereby energizing motor control 86, which, in turn, would start left reel motor 82 operating in a clockwise direction until sufficient tape was poured into storage chamber 79, causing a beam of light from incandescent bulb 90 to photoelectric cell 84 to be interrupted. The operation of photoelectric cells 87 and 88 in storage chamber 80 is the same and operates in a similar manner as just described for storage chamber 79. A vacuum pump 92 driven by motor 93 is connected to the lowest portion of storage chamber 79 and storage chamber 80, in order to keep a vacuum on the tape located in each chamber, which has the effect of increasing the over-all stability of the tape-handling mechanism.

Figure 15:
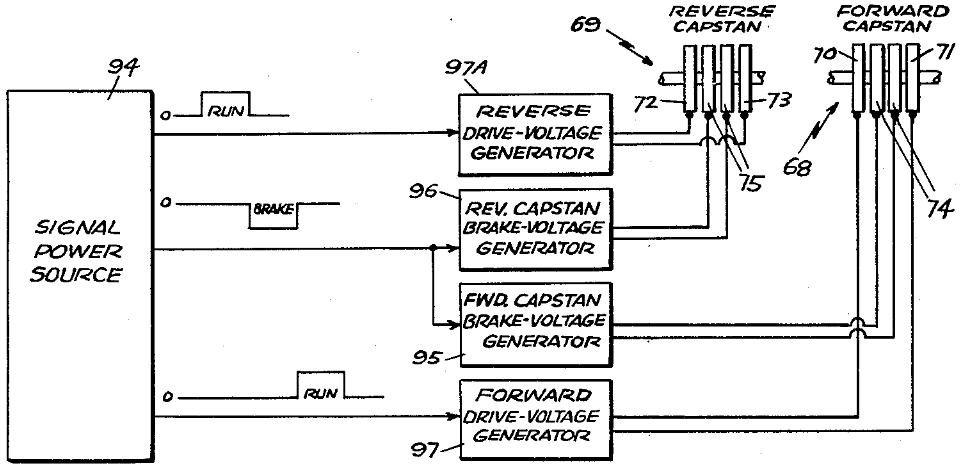
Fig. 15 is a block diagram illustrating the electrical connections to the capstans illustrated in Fig. 14.

Referring now to Fig. 15, there is shown a block diagram illustrating the electrical connection to the capstans 68 and 69 illustrated in Fig. 14. When the elements of neither the stationary sections nor the rotating sections of either capstans 68 or 69 are energized, the tape lies loose on the capstan. It is believed that when the stationary tape is wrapped around a rotating capstan it simply floats on a thin film of air, which acts as a lubricant between the tape and the rotating capstan. This film of air is of the order of one hundred micro-inches thick. In the usual course of operation, the tape is never left free on the rotating capstan, that is, it is usually attracted to the stationary section of both capstans, or else it is attracted to the rotating section of either capsan. Therefore, in is quiescent state, a brake pulse from a signal power source 94, which will preferably be a computer, will simultaneously feed a forward capstan brake voltage generator 95 and also the reverse capstant voltage generator 96. Since the output of forward capstan brake voltage generator 95 is connected to the conductive members of stationary section 74 of capstan 68 and the output of reverse capstan brake voltage generator 96 is connected to the conductive members of stationary section 75 of capstan 69, a capacitor circuit will exist from the conductive members in the stationary members of capstan 68 and capstan 69 to the conductive member in the tape. This action will cause an electrostatic force to appear between the tape and the stationary members of both capstans 68 and 69, thereby causing the tape to have an even electrostatic braking force from capstan 68 and capstan 69. If the tape is to be driven in a forward direction, signal power source 94 will emit a forward drive signal to forward drive voltage generator 97 which, in turn, is connected to the rotating sections 70 and 71 of capstan 68. At the same time that a forward drive pulse emanates from power source 94, the normally emitted brake pulse of power source 94 is removed from both the forward capstan brake voltage generator 95 and the reverse capstan brake voltage generator 96. The driving action is similar to the braking action previously described only now the electrostatic forces are generated between the tape and the rotating capstans 70 and 71 of capstan 68, thereby driving the tape at the same speed of the rotating section of the capstan. For reverse action with the tape moving in a forward direction, power source 94 will remove the pulse to forward drive voltage geneartor 97, energize forward capstan brake voltage geneartor 95 and reverse capstan brake voltage generator 96. A pulse is then fed to reverse drive voltage generator 97A which, in turn, will cause an electrostatic force to exist between the rotating members 72 and 73 of reverse capstan 69 and the tape. The mode of operation just described is only one of many systems that have been successfully tried on this high speed tape transport.

Referring now to Fig. 11 and Fig. 12, there is shown only the moving sections 98 and 99 of a capstan, illustrating the relative position of the moving parts of the capstan in relation to the tape. As mentioned previously, the leads from the conductive members of the rotating capstan are brought from a slip ring and brush assembly. In Fig. 11, the ring, or tire, which is in driving contact with the tape, is constructed of a conductive material 100, which is bonded to conducting members 100A and 100B, respectively. It will be noted that in Fig. 11 the only insulation barrier between the conductive member 31 on the tape and the conductive member 100 on the capstan is the thin layer of insulating material 33. This type of metal capstan has been called a hot capstan and has many advantages over the nonconductive capstan, one of which is there is no corona problem. It will be noted, therefore, that the electrostatic clutch illustrated in Fig. 11 is limited in that a voltage higher than the dielectric strength of nonconductive member 33 cannot be used, since conductive member 31 must never come into direct electrical contact with any member of a conductive or hot capstan. Fig. 12 differs from Fig. 11 in that a nonconductive tire 101 is used on the driving sections 98 and 99. In a similar manner as previously described, conductive member 101A is bonded to nonconductive member 101, and nonconductive member 102 is bonded to conductive member 101B.

Fig. 13 illustrates an equivalent electrical circuit of Fig. 12. Plate 103 represents conductive member 101A, dielectric 104 represents nonconductive member 101, plates 105 represent the surface charge on nonconductive member 101, dielectric member 106 represents the dielectric of the air between nonconductive member 33 on the tape, and nonconductive member 101 of the capstan, plates 107 represent the surface charge on nonconductive member 33, and plate 108 represents conductive member 31. In a similar manner plate 109 represents conductive member 101B, 110 represents the dielectric of nonconductive member 102, plates 111 represent the surface charge on nonconductive member 102, 112 represents the dielectric of the air between nonconductive member 33 and nonconductive member 102, plates 113 represent the surface charge on nonconductive member 33, 114 represents the dielectric of nonconductive member 33, and again 108 represents conductive member 31 on the tape. It can be seen, therefore, that the electrostatic forces are generated within a capacitive circuit made up of the capstan and the tape. A comparison of Fig. 11 with Fig. 12 will show that by making the ring member on the movable section of the capstan of a conductive material 100, the equivalent circuit diagram is reduced from three capacitors in series in parallel with three other capacitors in series, to two capacitors in series in parallel with two other capacitors in series. The system illustrated in Fig. 11 is more adaptable for use with direct current rather than with alternating current, with a corresponding resulting increase in savings of driving power needed.

Figure 16:
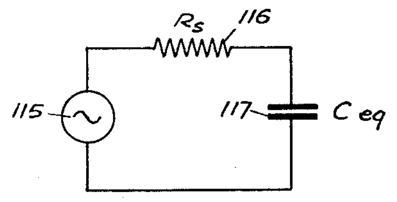
Fig. 16 is an equivalent electrical diagram of Fig. 15.
Figure 17:
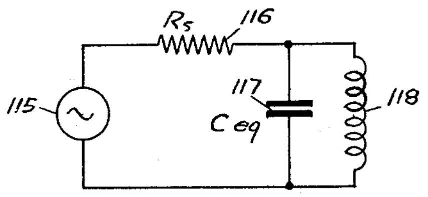
Fig. 17 illustrates a method of reducing the total reactive current needed in Fig. 16.

Referring now to Fig. 16, there is shown an equivalent circuit diagram of the tape drive mechanism consisting of a source voltage 115 in series with resistance 116, representing the in-phase losses of the circuit, in series with a capacitor 117, which represents the equivalent capacitive circuit of the tape drive mechanism, as shown in Fig. 12. It has been determined that by using an alternating current voltage at a moderately high audio-frequency across an almost purely capacitive load, that a fairly low impedance is represented by load capacitor 117. The low impedance, as represented by capacitor 117, has the effect of causing source voltage 115 to deliver a high reactive current. By placing an inductance 118, as shown in Fig. 17, in parallel with capacitor 117 and tuned with capacitor 117 to the desired frequency, the impedance presented to the generator at the driving source can be substantially increased. In other words, an inductance is placed in the driving circuit of the electrostatic tape drive mechanism so as to resonate with the equivalent capacitance as represented by the electrostatic tape drive mechanism, thereby showing a high impedance to the source voltage generator 115.

Figure 18:
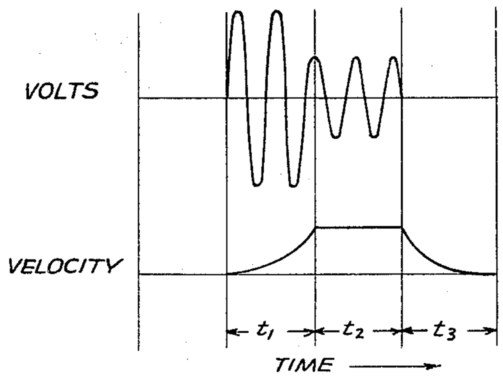
Fig. 18 illustrates a preferred wave form of capstan voltage.

As mentioned previously, there is always a thin film of air between the tape and the capstan, or at least to that part of the capstan that is not attracted to the tape. In order to change the condition of the tape, either from moving to a brake condition or from a brake to a moving condition, it is necessary first to remove this film of air, and it is this time that is spent in squeezing out the air that is represented as time $t_1$ in Fig. 18. It has been determined that for this time $t_1$ during which the tape is being attracted to the capstan a voltage of a higher magnitude can be used than is necessary for the driving voltage needed to continue the tape in contact with the capstan as represented by time $t_2$ in Fig. 18. For deceleration, this thin film of air previously referred to must be driven out between the tape and the fixed, or nonrotating section of the capstan. This deceleration time is represented as time $t_3$ in Fig. 18. It is apparent, therefore, that the voltage curve illustrated is equally applicable to both the forward drive voltage generator, the reverse drive voltage generator, and brake voltage generator. For quick acceleration and deceleration of the tape, it is necessary that the voltage rise quickly on one movable section of the capstan and at the same time drops quickly on the opposite movable section of the capstan. Moreover, the voltage at the very beginning must be high enough to impart the required acceleration to the tape causing it to overcome its own inertia and the drag exerted by the system on the tape. When the tape is stopped or is running at full speed, the steady state voltage on the capstan may be smaller because of the existing inertia forces on the tape. It has also been determined that in using alternating current to control the electrostatic forces between the capstan and the tape, that in order to successfully stop the tape in the shortest possible time, it is necessary to remove the driving voltage as it passes through zero, as shown in Fig. 18, before the braking force is applied. If this is not done, there would exist a trapped charge on the tape which would first have to be dissipated before the tape would respond to the braking force unduly delaying the braking time. Since it is not always possible to remove the braking voltage as it goes through zero when using an alternating current drive voltage, the problem of trapped charges has been eliminated to a great extent by using an alternating voltage driving signal.

It is believed that trapped charges within the dielectric of the capstan and the tape cause an undue delay time in acceleration and deceleration of the tape. An alternating frequency in the order of two kilocycles has been used to eliminate trapped charges when applying electrostatic forces between the tape and the capstan. In such a system this results in the condenser having to be charged many thousands of times per second, putting a heavy average load on the driving source. This frequency of a few kilocycles was chosen to prevent the tape from slipping in the very short interval of time when the voltage is low and changing polarity.

Figure 19:
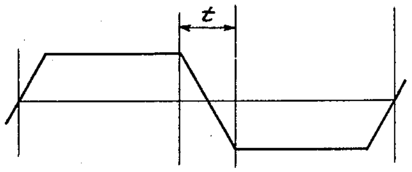
Fig. 19 illustrates a wave form of capstan voltage resulting in low power requirements of the driving source.

Referring now to Fig. 19, there is shown a trapezoidal wave form having a repetition rate of approximately 60 cycles. As long as the time $t$ is sufficiently short to prevent the tape from slipping, operation had been very satisfactory. This type of wave form greatly diminishes the number of times that the capacitive load has to be charged in one polarity or the other, greatly reducing the power requirements of the source generator.

Referring now to Fig. 5, there is shown another type of capstan called a six-section capstan, two sections 119 rotating in a clockwise direction, two sections 120 rotating in a counterclockwise direction, and two fixed sections 121 used for braking purposes. The applications for this six-section capstan will be apparent in view of the foregoing discussion of the four-element capstan.

Figure 20:
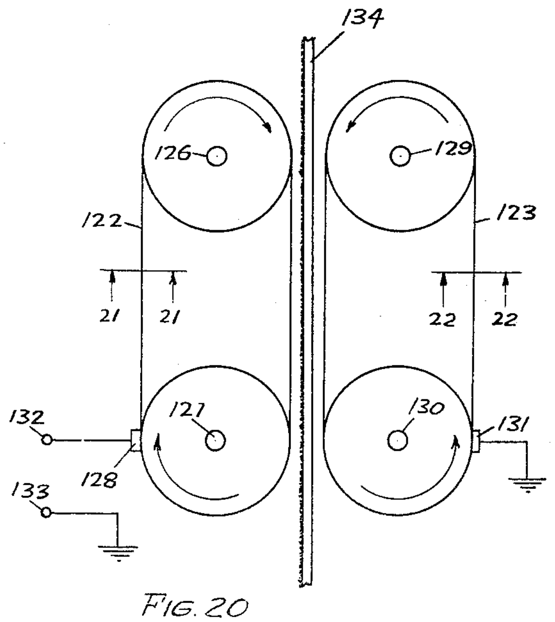
Fig. 20 illustrates another embodiment of this invention for controlling the movement of ordinary magnetic tape.
Figure 21:
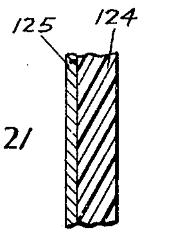
Fig. 21 is section 21—21 of the tape illustrated in Fig. 20.
Figure 22:
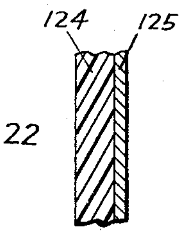
Fig. 22 is section 22—22 of the tape illustrated in Fig. 20.

Referring now to Figs. 20, 21, and 22, there is shown an endless tape 122 and 123 constructed of a nonconductive base member 124, such as cellulose acetate, having a conductive member 125, such as flashed silver, bonded thereto. Endless tape 122 rotates about continuously rotating members 126 and 127, and in such a manner that brush 128 is caused to bear on conductive surface 125 of tape 122. In a similar manner, endless tape 123 rotates about continuously rotating members 129 and 130 in such a manner as to allow brush 131 to continuously bear on conductive member 125 of tape 123. A drive voltage signal is applied to terminals 132 and 133 which, in turn, are effectively connected to brush 128 and brush 131. Tapes 122 and 123 are placed on opposite sides of a magnetic tape 134 that is to be controlled or moved. Therefore, whenever a drive signal voltage is applied to terminals 132 and terminals 133, tapes 122 and 123 are caused to attract each other by electrostatic forces. Tape 134 which is to be controlled will effectively insulate tapes 122 and 123 from each other, and will be moved along in the same direction as said tapes 122 and 123 are moving. It can be seen, therefore, that Fig. 19 is actually an embodiment of the use of electrostatic forces for the control of ordinary magnetic tape as it is known in the art today.

This completes the description of the embodiment of the invention illustrated herein. However, many modifications and advantages thereof will be apparent to persons skilled in the art without departing from the spirit and scope of this invention. For example, it will be noted that this invention is concerned with two members having surface areas in juxtaposition with respect to each other and arranged to prevent relative motion between said members, and means for impressing a sufficient electrostatic force between said areas to cause said members to engage each other at said areas with sufficient friction to restrain said relative motion. Accordingly, it is desired that this invention not be limited to the particular details of the embodiment disclosed herein, except as defined by the appended claims.

What is claimed is:

1. In combination, a capstan and a tape each responsive to the application of electrostatic forces for frictionally engaging said tape and said capstan to each other, said capstan comprising a plurality of rotating electrically separate members each consisting of a conductive member bonded to a non-conductive member with the non-conductive member forming an external surface adapted to engage the tape, and electrical brush means engaging the conductive member of each of said rotating members and adapted when connected to a voltage source to impress a voltage on said conductive members of said capstan to cause an electrostatic force between said capstan and said tape by way of an electrical path extending through said non-conducting members and the tape.

2. In combination, a tape and a capstan each responsive to the application of electrostatic forces for frictionally engaging said tape and said capstan to each other, said capstan comprising a plurality of continuously rotating sections and a plurality of stationary sections each of which consists of a conductive member bonded to a nonconductive member, means for impressing a sufficient voltage across the conductive members of said rotating sections of said capstan to cause an electrostatic force between said rotating section and said tape when it is desired to drive said tape, and means for impressing a sufficient voltage across the conductive members of said stationary sections of said capstan to cause an electrostatic force between the stationary members of said capstan and said tape when it is desired to stop said tape.

3. In combination, a four-element capstan and a tape each responsive to the application of electrostatic forces for frictionally engaging said tape and said capstan to each other, said four-element capstan comprising two continuously rotating elements and two stationary elements each consisting of a conductive member bonded to a nonconductive member, means for impressing a sufficient voltage across the conductive members of said continuously rotating elements of said capstan to cause an electrostatic force between the rotating elements of said capstan and said tape when it is desired to drive said tape, and means for impressing a sufficient voltage across the conductive members of said stationary elements of said capstan to cause an electrostatic force between the stationary elements of said capstan and said tape when it is desired to stop said tape.

4. In combination, a tape and a capstan responsive to the application of electrostatic forces for frictionally engaging said tape and said capstain to each other, said capstan comprising a plurality of electrically separate members each formed of a conducting member and a nonconducting member affixed thereto with the latter adapted to engage the tape for motion controlling purposes, an electrical switching means connected to each of said conducting members for impressing a voltage directly on said conducting members to establish an electrical circuit through said non-conducting members and the tape, said switching means producing an initial high amplitude voltage to cause an electrostatic force of high initial amplitude between said tape and said capstan to force the entrapped air from between the tape and the non-conducting members to thereby increase the speed of response of said motion controlling capstan to a motion controlling voltage.

5. An electrostatic motion controlling means for a tape having an electrostatically attractive member therein comprising a pair of motion controlling members over which said tape is adapted to pass, each of said motion controlling members comprising a conducting element having a nonconductive member on the surface thereof on the side adjacent said tape, and a source of control potential connected between said conductive elements so that a closed electrostatic circuit is formed between said elements by way of said nonconducting members and the electrostatically attractive member in said tape.

6. Apparatus as claimed in claim 5 wherein said pair of motion controlling members are mounted on a common axis.

7. Apparatus as claimed in claim 5 wherein said pair of motion controlling members are mounted on separate axes displaced longitudinally along said tape.

8. In combination, a six element capstan and a tape each responsive to the application of electrostatic forces for frictionally engaging said tape and said capstan to each other, said six element capstan comprising a first pair of continuously rotating elements adapted to rotate in a first direction, a second pair of continuously rotating elements adapted to rotate in the direction opposite to said first pair, and two stationary elements, each of said six elements comprising a conductive member bonded to a nonconductive member, means for impressing a sufficient voltage across the first or second pair of conductive members of said continuously rotating elements of said capstan to cause an electrostatic force between the selected rotating elements of said capstan and said tape when it is desired to drive said tape in one direction or the other, and means for impressing a sufficient voltage across the conductive members of said stationary elements of said capstan to cause an electrostatic force between the stationary elements of said capstan and said tape when it is desired to stop said tape.

9. Apparatus for use with a data storage tape comprising a data transfer means positioned so that said tape may be passed transversely thereof, a first driving means comprising a continuously rotating means positioned to engage said tape at a point along the length thereof displaced from said data transfer means, a second driving means comprising a continuously rotating means positioned to engage said tape along the length thereof displaced from said data transfer means on the opposite side of said first driving means, a tape motion inhibiting means comprising a pair of braking means positioned on opposite sides of said data transfer means along the length of said tape, and means for selectively activating said first or second driving means or said motion inhibiting means.

10. A motion controlling means for a tape comprising a pair of continuously rotating elements and a pair of stationary elements, each of said elements comprising a conductive member having a nonconductive member formed on the surface thereof and each being arranged on an axis common to the other elements, said first and second pair of elements being symmetrically positioned with respect to the tape whose motion is to be controlled, and means selectively impressing a voltage across said first or said second pair of elements to cause an electrostatic motion controlling force to act on said tape.

11. Apparatus for use with a data storage tape comprising a data transfer means positioned so that said tape may be passed transversely thereof, a first driving means comprising a continuously rotating means positioned to engage said tape at a point along the length thereof displaced from said data transfer means, a second driving means comprising a continuously rotating means positioned to engage said tape along the length thereof displaced from said data transfer means on the opposite side of said first driving means, tape motion inhibiting means comprising a pair of braking means positioned on opposite sides of said data transfer means along the length of said tape, each of said pair of braking means being positioned adjacent to the associated driving means so that a straight line passing along the surface of said braking means is tangential to the surface of the adjacent driving means, and means coupled to said first and second driving means for selectively activating either said first or said second driving means to effect the driving of said tape.

12. Apparatus for controlling the motion of an elongated flexible tape comprising a cylindrical capstan adapted to be continuously rotating in a given direction and to engage the surface of said tape, means coupled to said capstan to effect a tape driving connection between said capstan and said tape, a tape brake for engaging the surface of said tape comprising a cylindrical member mounted on the same axis as said capstan, and means coupled to said brake for effecting a tape stopping connection between said tape and said brake.

13. Apparatus for controlling the motion of an elongated flexible tape comprising a pair of cylindrical capstans each adapted to be continuously driven in a direction opposite to the direction of the other and to engage a surface of said tape, means coupled to each of said capstans to selectively effect a tape driving connection between one or the other of said capstans and said tape, a pair of tape brakes each adapted to engage a surface of said tape and comprising a cylindrical member mounted on the same axis as one or the other of the associated capstans, and means coupled to each of said brakes for effecting a tape stopping connection between said tape and said brake.

References Cited in the file of this patent

UNITED STATES PATENTS

| | | |
|---|---|---|
| 287,957 | Osborne | Nov. 6, 1883 |
| 1,155,727 | Harwood | Oct. 5, 1915 |
| 1,706,741 | Pugh | Mar. 26, 1929 |
| 2,148,482 | Lorenz | Feb. 28, 1939 |
| 2,193,189 | Brooke | Mar. 12, 1940 |
| 2,258,106 | Bryce | Oct. 7, 1941 |
| 2,417,850 | Winslow | Mar. 25, 1947 |
| 2,459,260 | Brown | Jan. 18, 1949 |
| 2,568,824 | Rahbek | Sept. 25, 1951 |
| 2,576,882 | Koole | Nov. 27, 1951 |